United States Patent

Mason et al.

Patent Number: 5,148,924
Date of Patent: Sep. 22, 1992

[54] SHEET MATERIAL HANDLING FRAME

[75] Inventors: Stuart V. Mason, Biggleswade; Robert M. Agnew, Datchworth, both of United Kingdom

[73] Assignee: Mark Abrahams & Sons, Ltd., Waltham Aldrey, United Kingdom

[21] Appl. No.: 469,544
[22] PCT Filed: Sep. 16, 1988
[86] PCT No.: PCT/GB88/00765
§ 371 Date: May 15, 1990
§ 102(e) Date: May 15, 1990
[87] PCT Pub. No.: WO89/02407
PCT Pub. Date: Mar. 23, 1989

[30] Foreign Application Priority Data

Sep. 16, 1987 [GB] United Kingdom ............... 8721824

[51] Int. Cl.$^5$ ............................................. A47G 19/08
[52] U.S. Cl. ...................................... 211/41; 414/608; 296/3; 410/32; 206/451; 206/454
[58] Field of Search ............... 211/41; 414/608; 296/3; 410/32; 206/451, 453, 454; 224/277, 42.45

[56] References Cited

U.S. PATENT DOCUMENTS

| 2,827,190 | 3/1958 | Spitzmesser | 414/608 |
| 3,887,071 | 6/1975 | Thomaswick | 206/45 X |
| 3,913,965 | 10/1975 | Muller et al. | 211/41 X |
| 4,014,435 | 3/1977 | Rowley et al. | 206/454 X |
| 4,156,498 | 5/1979 | Miller | 206/451 X |

FOREIGN PATENT DOCUMENTS 1051444 12/1966 United Kingdom .
1052833 12/1966 United Kingdom .

Primary Examiner—Carl D. Friedman
Assistant Examiner—Korie Chan
Attorney, Agent, or Firm—Patrick Michael Dwyer

[57] ABSTRACT

A sheet material handling frame comprises a plurality of base portions (18) for supporting material, such as sheet glass. A stanchion (16) extends from each base portion (18). The stanchions (16) are held in a spaced relationship by means of cross-bars (12, 14). Each stanchion (16) is formed with a slot in which a strap guide (24) is slideably movable. A securing strap passes inside the stanchion (16) through the hollow base (18) around the sheet material and over the strap guide (24). Thus, the strap guide is movable to accommodate different heights of material loaded on the frame. The frames are securable back-to-back to form a structure which is capable of carrying sheets of different sizes. When the sheet material is being loaded, the strap guide (24) is pivoted about a pair of retaining lugs into the slot so that it is out of the way. The strap guide (24) is provided with a hook-like recess (27) which is used to engage a retaining pin inside the slot when it is not in use.

14 Claims, 4 Drawing Sheets

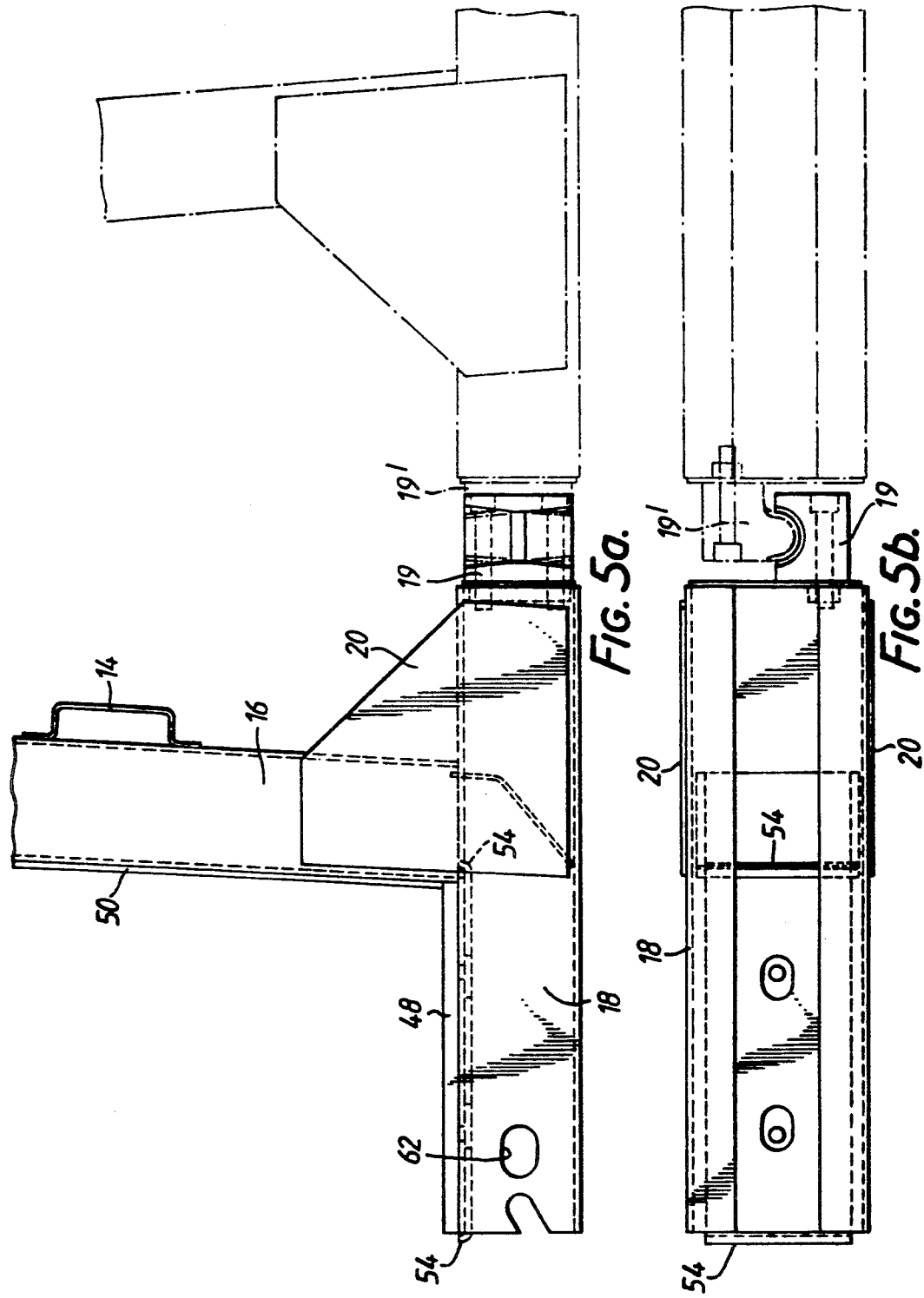

SHEET MATERIAL HANDLING FRAME

This invention relates to sheet material handling frames. The invention is particularly applicable to a frame for handling quantities of materials such as glass in sheet form both for storage and for transport.

In the glass industry large area sheets of glass are manufactured called "jumbo" sheets. These jumbo sheets are supplied by the manufacturer to a distributor for cutting into apparatus smaller standard sizes. The jumbo sheets are usually cut according to demand for different sizes. Clearly, when a jumbo sheet is cut consideration has to be given to the optimum way in which it can be done to minimise the amount of wasted material. Thus, a specific order for glass may not be satisfied from a single jumbo sheet in which case it is necessary to store sheets of glass not only prior to distribution but also while an order is awaiting completion.

Consequently, a warehousing facility for prepared glass requires that the glass can be stored and transported about a site with as much ease as possible. Furthermore, it is necessary that the glass can be loaded for distribution as conveniently as possible.

A frame for transporting and storing sheet glass is known in which a generally L-section frame provides a foot for a base on which one edge of a stack of sheets of glass rests and a supporting upright stanchion against which the stack is leant. The stack is held in place against the upright stanchion of the L-section frame by a vertical bar which has a peg formed on its lower end which engages with one of a series of slots in the foot according to the thickness of the stack. The upper end of the vertical bar is secured to an upper horizontal bar, extending from the stanchion, by means of a bolt which protrudes through one of a series of through holes in the upper bar, again according to the thickness of the stack. The glass is held together by means of a horizontal strap which passes around the stack. A lifting bar is attached to the top of the upright by which the glass can be lifted.

A T-section frame has also been proposed. However, only one size of sheet of glass can be stacked against the sides of a central supporting upright. The sheets are strapped to base boards, provided on the lower arms of the T-section frame. Wooden blocks are placed on the top of the stack in the way of the straps to clamp the glass in place. The straps are thus used to bind the stack together and secure it to the frame. Outermost central uprights are provided with lifting points to which a hoist can be attached in order to transport the loaded frame.

Furthermore the T-frame assemblies are made up from several components comprising steel members, timber platforms and cardboard strips. The timber items themselves have to be assembled from planks which have to be cut to size and trimmed prior to being assembled. Thus, the time and labour required to build enough T-frames can be considerable. While the steel members are often collected from customers the timber is often damaged and, in any event, rarely returned.

Another significant disadvantage of these known T-section frames is that the frames must be secured in place when being transported by, for example, road. The more or less custom-built T-section frame does not have a standard base which could be secured to any standard securing means on the vehicle.

It is an object of the present invention to provide a versatile frame for supporting sheet material which can be easily loaded and which is both secure and stable.

According to the present invention a sheet material handling frame comprising a base for supporting the material, at least one stanchion extending up from the base, first securing means for retaining the bottom of the material against at least one stanchion, and lifting means attached toward the top of the stanchion by which the apparatus may be transported, is characterised in that the second securing means are longitudinally movably retained by the stanchion to accommodate different heights of sheet.

Preferably, the apparatus is provided with a lifting bar which is releasably secured to the stanchion. In this case the bar extends over the base and is provided with spaced points, corresponding generally to the lateral edges of the base, by which the frame may be lifted. Preferably the bar is maintained in place on the frame by means of a locating pin.

Preferably, the first and second securing means are constituted by a strap which, in use, passes around the material, through a longitudinal slot in the stanchion and beneath the base, a strap guide, providing a channel for the strap extending out of the slot, being slideable retained within the slot and extending therefrom to rest on the top edge of the material, to hold the material in position on the frame. It is preferable if this strap guide is pivotable within the slot so that it may be moved between its position in use above the material and another position in which the strap guide is substantially wholly received within the slot. It is desirable that this strap guide is provided with a hook formation, possibly in the form of a hook-like recess, which is arranged to be engageable with a formation inside the slot to hold the strap guide in the other position. In this case, and when the lifting bar is held in position by a pin, it is convenient for the pin to be used as the formation within the slot to which the strap guide can be hooked.

In order to store more than one size of glass it is preferable if two such frames are attachable back-to-back. To this end, it is preferable if the lifting bar is adapted to be securable to both frames in such a back to back relationship. It is also preferable if the adjacent lower ends of the two frames in the said relationship are formed with complementary locating lugs. In this way, the frames are connectable for storage and/or transport.

The invention can be put into practice in several ways, one of which will now be described by way of example with reference to the accompanying drawings in which.

Figure 1:
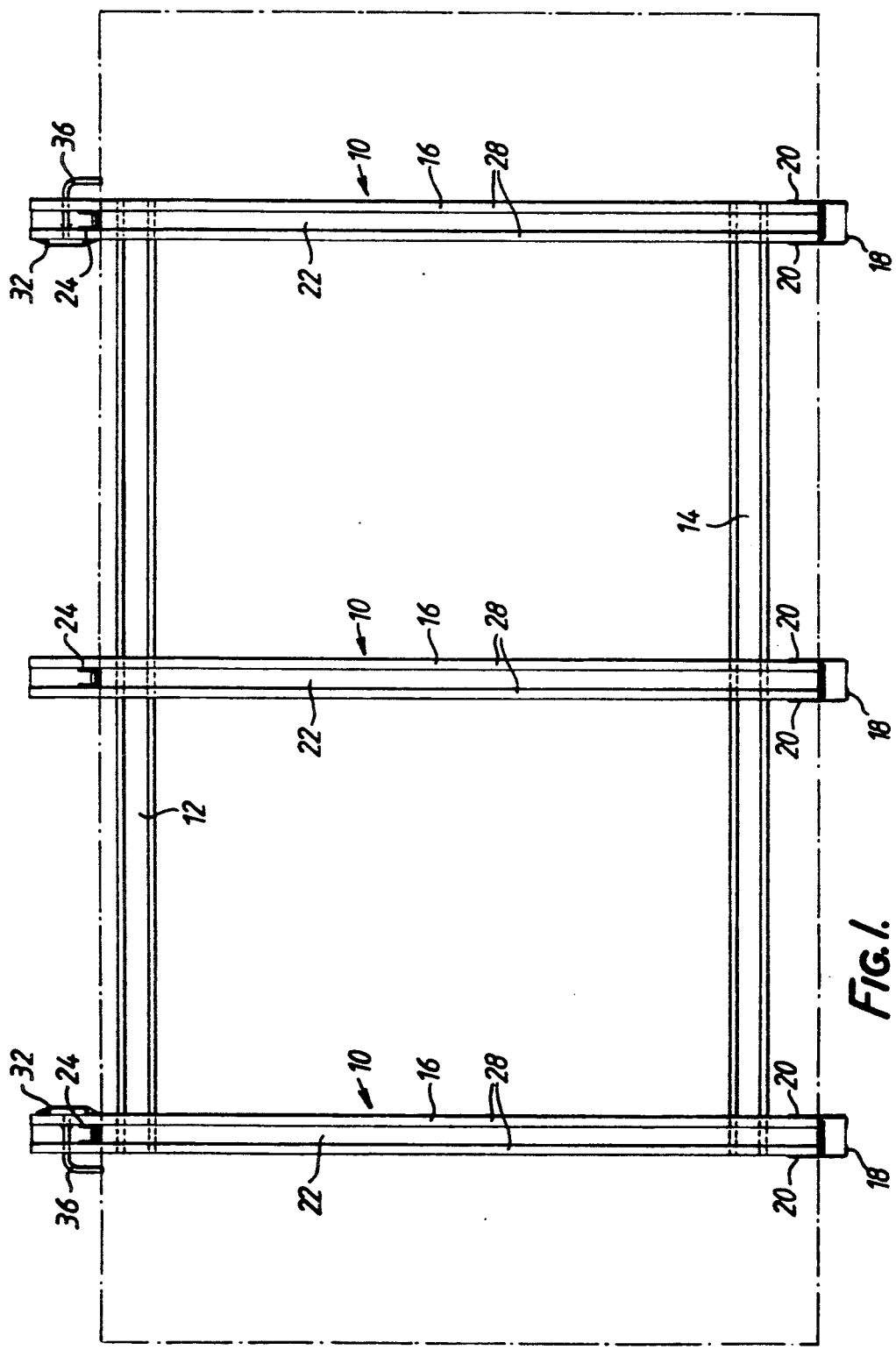
FIG. 1 is a side elevation of a frame according to the present invention.
Figure 2:
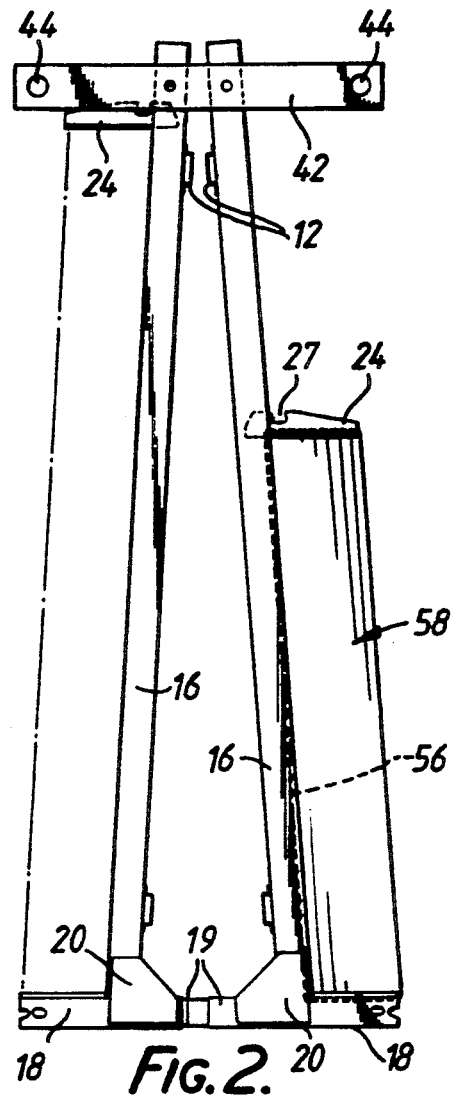
FIG. 2 is an end elevation of two of the frames in FIG. 1 connected back to back.
Figure 3A:
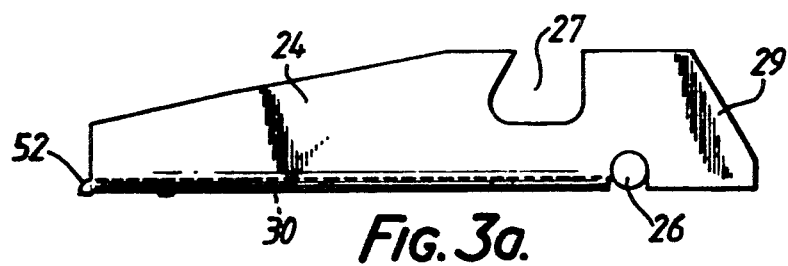
Figure 3B:
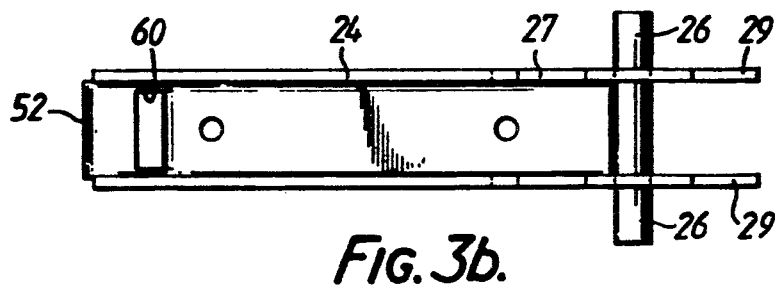
Figure 4A:
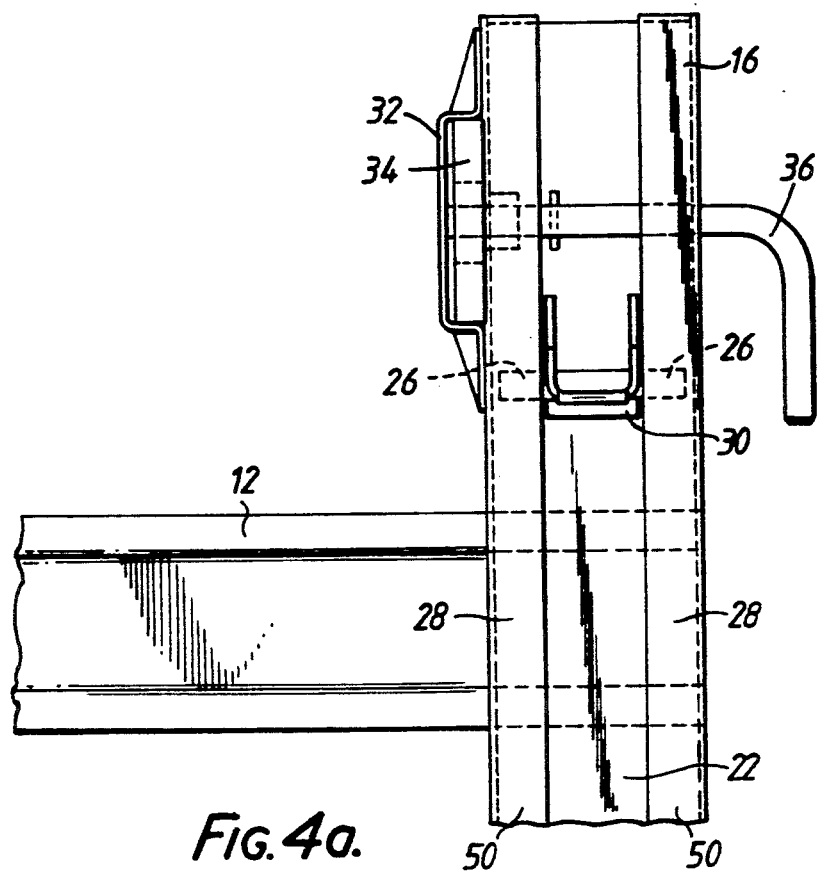
Figure 4B:
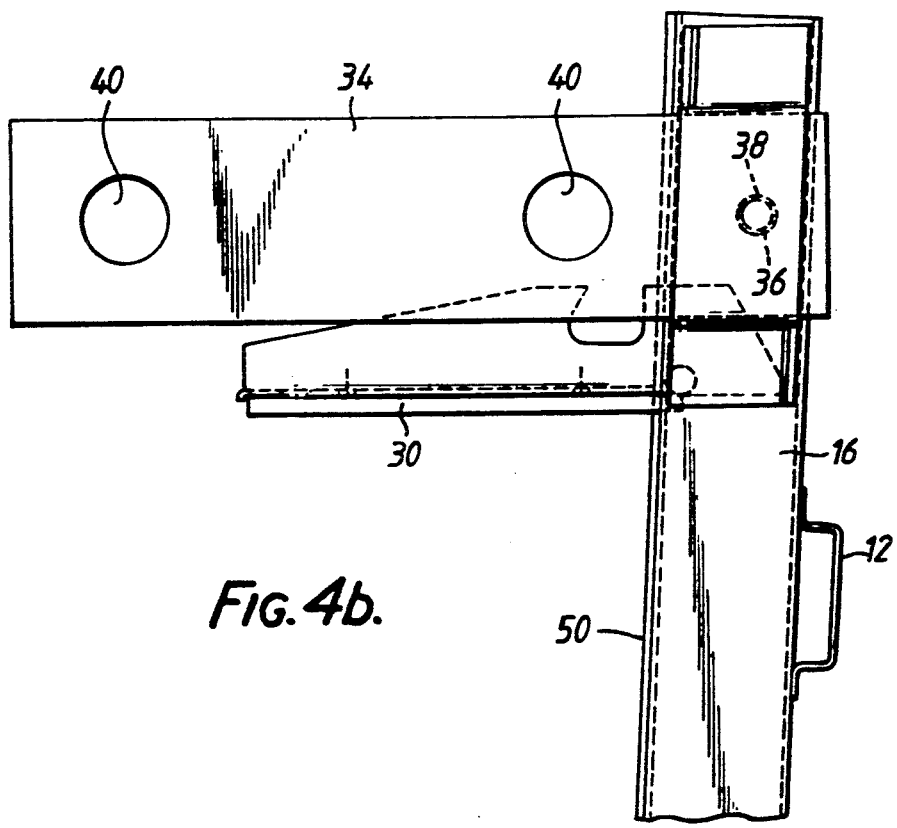

FIGS. 3a) and b) are details of a strap guide used in the frame of FIG. 1;

FIGS. 4a) and b) are scrap-sections of the frame in FIG. 1 illustrating an alternative lifting bar; and FIGS. 5a) and b) are scrap-sections of the frames of FIG. 2, illustrating the connection of the frames at the bases thereof.

Referring to the drawings a frame comprises three generally L-shaped metal supports 10 which are held in a spaced side-by-side relationship by upper and lower crossbars 12 and 14, respectively. A stanchion in the form of an upright portion 16 of each support 10 extends from a hollow box-section foot 18 at an angle of about 93°. The upper surface of the foot 18 provides a base for the sheets of glass. A stiffening web 20 is welded between the upright and a backwardly extending portion of the foot 18 on either side of each support 10. A locating lug 19 is attached to the end of the backwardly extending portion of each foot 18. The lugs 19 are either male or complementarily female in nature such that they will engage when two frames are connected back-to-back as will be described in more detail below.

The section of each upright 16 is generally a flat sided C-shape to provide a partially enclosed channel 22 which has an opening facing away from the cross-bars 12 and 14. The passage defined by the foot 18 communicates with the interior of the channel 22.

A U-section nylon or metal strap guide 24 is received in each channel 22. The strap guide is illustrated in detail in FIGS. 3a) and b). Its width is generally the same as that of the opening in the channel 22. A pair of retaining lugs 26 are formed from a laterally extending pin secured in a recess in the base of the guide 24. When the guide is inserted in one of the channels 22, the lugs 26 engage behind a pair of flanges 28 which define the opening slot in the channel 22. Thus, the strap guide 24 is free to move up and down in the channel 22 but is prevented from being pulled out by the lugs 26. In each arm of the U-section of the guide 24 a hook-like recess 27 is formed. This is used to hand the guide, when it is not in use, in the channel 22 as will be discussed in more detail below. Alternatively, the section of the strap guide can be dimensioned so that it can be twisted in the channel 22 to bring the lugs into a vertical orientation. In this twisted orientation the guide can be completely removed when it is not in use.

The rear of each guide 24, i.e. that part received in the channel 22, is formed as a pair of side plates 29 with no connecting base portion. The rear edges of the plates 29 are chamfered. The guide 24 can thus be rotated about the lugs 26 engaging the inside of the flanges 28 so that is can be brought flush, or substantially so, with the open face of the upright 16 without it catching on the back wall of the channel 22. An elastomeric cushion backing 30 is attached to the base of the U-section strap guide 24.

A horizontal retaining sleeve 32 is formed from a plate welded to the innermost side of each of these outermost uprights 16. A removable lifting bar 34 (shown in FIGS. 4a) and b)) is received in the sleeve 32. The top of each outermost upright 16 is formed with holes in opposite sides of the C-section. A locating pin 36 inserted through the holes in the upright 16 also passes through a suitable locating hole 38 in the bar 34 to hold it in position. The pin is biased to the inserted position by a spring. The hole remote from the lifting bar 34 through which the pin 36 extends is formed with an axially extending slot. By rotating the pin so that is handle portion is aligned with the slot, the pin is insertable into the lifting bar 34. When the handle portion is out of registry with the slot, the pin is held in a disengaged position against the action of the biasing spring. The bar also has a pair of spaced holes 40 formed in it by which the frame can be lifted.

It will be noted that the bar in FIG. 2 indicated by the numeral 42 is slightly different to that in FIGS. 4a) and b). The bar 34 in FIGS. 4a) and b) is for lifting a single frame. The bar 42 is used for lifting and securing together a pair of frames, as illustrated in FIG. 2. As previously mentioned, the connection of two frames will be described in more detail below.

The top of the feet 18 and the prominent edges of the upright 16 each have a strip of cushion backing material 48 and 50, respectively attached to them to protect the glass when it is being loaded and transported.

The front edge of the strap guide 24 is formed with a small curved lip portion 52 which prevents a strap 56 passing over the guide 24 from chafing on an otherwise sharp edge. Similarly, the upper inside surface of each of the box-section feet 18 is provided with a lip 54 at each end where the strap passes.

Sheet glass 58 is commonly supplied in batches of 28 or 56 sheets. The glass of one size is loaded onto the foot 18 and leant against the uprights 16. In loading the glass, it is preferably to have the strap guide 24 flush with the flanges 28 so that there is no danger of them catching the glass as it is positioned on the frame. Thus, the strap guides 24 are hooked onto the pins 36 substantially flush with the slot. Once the required number of sheets are in position, the strap guide 24 is unhooked from the pin 36 and rotated about it lugs 26 to extend over the glass. The guides are then moved along the respective channels 22 until they rest on top of the glass 58. The strap 56 which runs out of the foot at one end and along the channel and out through the cleft of the strap guide 24 at the other, is tied or otherwise secured together to hold the glass in place. The glass 58 is protected by the backing strips on the adjacent faces of the uprights feet and strap guides. In the vent that the thickness of the stack of glass is considerably less than the length of the strap guide 24 the binding action of the strap guide may be compromised. To overcome this, the strap guide 24 can be formed with an aperture 60, as shown in FIGS. 3a) and 3b). In this case, when a thin stack of glass is to be bound to the frame the strap 56 is passed through this aperture instead of over the end. Alternatively, a wooden batten, having a length approximately the same as the upright dimension of the glass on the frame, can be positioned between each strap 56 and the outermost glass sheet as a spacer. With the frame loaded, the lifting bars 34 are inserted in the sleeves 32 and secured in position by the pins.

When two frames are to be used back-to-back the lifting bar 42 shown in FIG. 2 must be used. In the bar 42 there are formed two locating holes into each of which a pin 36 from each frame extends to secure the tops of the frames together. A lifting hole 44 is also formed in the bar 42 on either side of locating holes. Each lifting hole 44 is generally above the lateral end of the foot remote from its junction with the upright 16.

At the base of each frame the locating lugs 19 on the rear extension of one foot 18 is received in the complementary locating lug 19' in an opposite foot of the other frame. Thus, by means of the pins and the locating lugs and recesses, the two frames are held together securely and can be lifted on the lifting bar 42. The glass sheets on one side of the frame can be of a different size to those on the other without the difference effecting the security of the mounting of the sheets.

Partly due to the spaced lifting holes 44 being positioned out over each load of glass, any discrepancy in weight between the two loads of glass on either side will leave the lifting characteristics of the connected frames substantially unaffected. Thus, the amount by which a connected pair of frames will tend to tip to the weightier side will be minimised.

When connected pairs of frames are to be transported it is clearly necessary to be able to secure to the transporting vehicle and the easier the method of securement the better it will be for the supplier of the glass and customer alike. As the frame has a standard foot spacing it is possible to construct a series of parallel tracks on the bed of a transporting vehicle. The feet can be slid along the tracks. Once in position, the feet are secured in place by means of pins passing through holes in the track and holes 62 in the feet 18 (see FIG. 5a)). The pins can be actuated simultaneously by linking them all to an actuating arm by means of a suitable crank and con-rod arrangement. Alternatively, or for additional safety, the connected frame can be tied to the bed. Conveniently, this can be achieved by using a horse-shoe shaped saddle. The ends of the saddle are wedged in the open upper ends of one or more of the opposing pairs of the uprights 16. The saddle is formed with a pair of horizontal pegs around which a web or strap passes. The strap is secured to the bend on either side of the connected frames. Thus, the saddle serves also to maintain the spacing of the upper portions of the frames and the lifting bar 42 can be removed.

Similarly, a single frame can also be secured for transport using a single wedge shaped anchoring plate inserted in the open end of the upright 16.

We claim:

1. A sheet material handling frame comprising a base for supporting the sheets, at least one stanchion extending up from the base, first securing means for holding the bottom edge of the sheets against at least one stanchion, second securing means for holding the top edge of the sheets against said stanchion, and lifting means attached toward the top of the stanchion by which the apparatus may be transported, wherein the second securing means are longitudinally movably retained by the stanchion to accommodate different heights of sheet, and wherein the first and second securing means are comprised of a strap which, in use, passes beneath the base, around the material, through a longitudinal slot in the stanchion, and over a strap guide which is slidably retained within the slot and which extends therefrom to rest on the top edge of the sheets when loaded on the frame.

2. A frame as claimed in claim 1, in which the strap guide defines a channel which extends outwardly substantially perpendicularly with respect to the stanchion along which the strap passes, in use.

3. A frame as claimed in claim 2, in which the strap guide is pivotable between the position in which it is substantially perpendicular to the stanchion and another position in which the strap guide is received within the slot.

4. A frame as claimed in claim 3, in which the strap guide is provided with a hook formation which is arranged to be engageable with a formation in the slot to hold the strap guide in the slot.

5. A frame as claimed in claim 4, in which the hook formation is defined by a recess in the strap guide which is hookable onto a projection in the slot.

6. A frame as claimed in claim 5 in which the lifting means are constituted by a lifting bar which is releasably secured to the stanchion, the bar extending over the base and having spaced lifting points positioned over the base by which the frame is liftable.

7. A frame as claimed in claim 2, in which the lifting means are constituted by a lifting bar which is releasably secured to the stanchion, the bar extending over the base and having spaced lifting points positioned over the base by which the frame is liftable.

8. A frame as claimed in claim 3, in which the lifting means are constituted by a lifting bar which is releasably secured to the stanchion, the bar extending over the base and having spaced lifting points positioned over the base by which the frame is liftable.

9. A frame as claimed in claim 4, in which the lifting means are constituted by a lifting bar which is releasably secured to the stanchion, the bar extending over the base and having spaced lifting points positioned over the base by which the frame is liftable.

10. A frame as claimed in claim 1, in which an extension of the base portion past the stanchion is formed with a locating lug and in which attachment means are provided on the top of the frame, the attachment means being arranged to connect the frame with a similar frame in a back-to-back relationship, such that the locating lug engages with a complementary formation on the said similar frame when connected.

11. A frame as claimed in claim 1, in which a plurality of bases and corresponding stanchions are secured in spaced side-by-side relationship by at least one cross-bar extending between them.

12. A frame as claimed in claim 1, in which the lifting means are constituted by a lifting bar which is releasably secured to the stanchion, the bar extending over the base and having spaced lifting points positioned over the base by which the frame is liftable.

13. A frame as claimed in claim 1, in which the lifting means are constituted by a lifting bar which is releasably secured to the stanchion, the bar extending over the base and having spaced lifting points positioned over the base by which the frame is liftable.

14. A frame as claimed in claim 12, in which the strap guide is provided with a hook formation which is arranged to be engageable with a formation in the slot to hold the strap guide in the slot, the hook formation being arranged to engage with a pin holding the lifting bar in position.

* * * * *